April 17, 1962     D. E. STOLLE     3,029,522
DEVICE FOR DETERMINING SURFACE IRREGULARITIES
Filed Dec. 18, 1958     6 Sheets-Sheet 1

April 17, 1962  D. E. STOLLE  3,029,522
DEVICE FOR DETERMINING SURFACE IRREGULARITIES
Filed Dec. 18, 1958  6 Sheets-Sheet 2

April 17, 1962 D. E. STOLLE 3,029,522
DEVICE FOR DETERMINING SURFACE IRREGULARITIES
Filed Dec. 18, 1958 6 Sheets-Sheet 3

April 17, 1962 D. E. STOLLE 3,029,522
DEVICE FOR DETERMINING SURFACE IRREGULARITIES
Filed Dec. 18, 1958 6 Sheets-Sheet 4

United States Patent Office 3,029,522
Patented Apr. 17, 1962

3,029,522
DEVICE FOR DETERMINING SURFACE
IRREGULARITIES
Donald Eugene Stolle, White Plains, N.Y., assignor to
Standard-Vacuum Oil Company, White Plains, N.Y.,
a corporation of Delaware
Filed Dec. 18, 1958, Ser. No. 781,385
7 Claims. (Cl. 33—174)

This invention relates to apparatus for measuring and recording surface irregularities of surfaces due to various causes and, more particularly, surface irregularities in metal surfaces due to corrosion.

The surface of solid objects, and especially metal objects, such as those made of steel are subject to corrosion and it is often desirable to measure and record the surface condition of such objects. If the corroded surface is pitted, it is often desirable to have an accurate measurement of the depths of the pits and also the pit distribution over extended areas of the surface.

The object of this invention is to provide an apparatus, or instrument, for measuring several factors of surface irregularities, and especially corrosion, and still more particularly, pit corrosion on both flat and curved surfaces; the apparatus being further adapted to record in graphic form the surface conditions of the test piece over extended surface areas. The apparatus of the invention is adapted to measure and record in graphical form various factors which are useful for pit corrosion analysis, including: maximum pit depth, pit pattern, pit density, pit dimensions and pit severity, at any depth.

According to one embodiment of the invention, the apparatus is made in two main components or units. One component is a unit for traversing or scanning the surface to be tested and it contains feeler arms having probing fingers which operate devices in that unit in response to changes in surface conditions of the surface traversed, and the other component is a unit for recording the surface conditions of the surface in response to the operation of those devices. The surface-traversing unit comprises, in its simplest form, a pivoted feeler-arm, having a pointed probing finger, mounted in a supporting structure manually movable over a surface to be tested. The pivoted feeler-arm is connected to operate devices in an electrical circuit which in turn are connected by electrical wiring with the recording unit. The recording unit comprises styluses mounted on a suitable supporting means which also carries a travelling chart on which the styluses, in response to movement of the devices in the surface-traversing unit, record in graphical form the conditions of the surface over which the traversing unit is passed.

In a preferred embodiment, the traversing unit is provided with a plurality of pivoted feeler-arms each having a probing finger, said arms being mounted on a common pivot shaft to provide an instrument to cover a wide path for each pass of the traversing unit over the surface of the test piece. And the recording unit is provided with a sufficient number of styluses connected in the electrical circuit for operation in response to movement of the plurality of pivoted feeler-arms and fingers which are mounted in the traversing unit. Also, provision is made to adjust the position of the plurality of feeler-arms to adapt the instrument for testing curved, as well as flat, surfaces.

Although the novel features which are believed to be characteristic of the invention are pointed out in the annexed claims, the invention itself as to its objects and advantages and the manner in which it may be carried out, may be better understood by reference to the following description taken in connection with the accompanying drawings showing a preferred embodiment, and forming a part hereof, in which:

Figure 1:
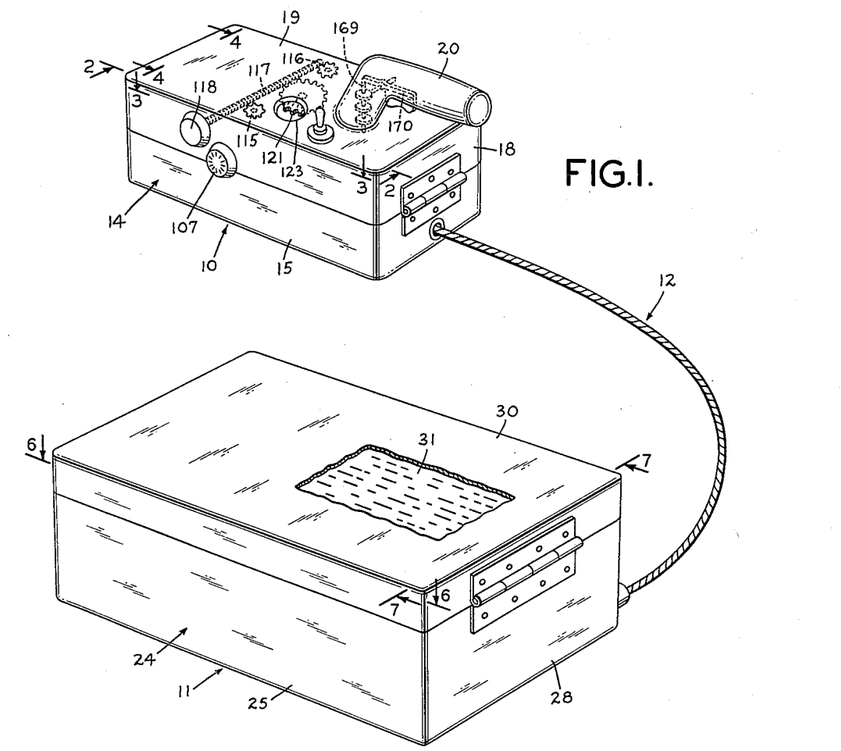
FIG. 1 is a view in perspective of the instrument, showing the traversing unit connected with the recording unit.

Referring now to the drawings in which like reference characters indicate like parts throughout the several views, the instrument comprises, in general (see FIG. 1), a traversing unit 10 (which may also be referred to as a scanning unit), and a recording unit 11 connected together by a cable 12 containing conductor wires, as described later. The traversing unit is for manual movement over the surface of the object being tested (the object being herein referred to as a test piece and indicated by reference numeral 13). The recording unit ordinarily is maintained in stationary position, at least during a test; sufficient length of cable 12 being provided so that the recording unit may, if desired, be placed at a considerable or convenient distance from the place or surface being tested.

The transversing unit comprises, in general, a framework which may conveniently be in the form of a housing 14, of a size suitable for manipulation, or scanning, by hand. The housing, as shown, has side walls 15, 16, a front end wall 17, a rear end wall 18, a top wall 19 from which extends a handle 20, and a bottom wall 21 having openings 22 and 23. The feeler and probing mechanism, described later on, is mounted within the housing 14.

The recording unit comprises, in general, a framework which may conveniently be in the form of a housing 24 in which to mount and house the recording devices later to be described. In general, the housing has side walls 25, 26, end walls 27, 28, bottom wall 29 and top wall or cover 30, which, if desired, may be of transparent material or contain a window to expose to view, the travelling chart 31, later described.

The recording unit is provided with a travelling chart 31 upon which is recorded in graphical form the surface condition over which the traversing unit is passed. To operate the chart, the traversing unit has a rear wheel roller 32 mounted on a shaft 33, in turn, mounted to rotate in bearings 34 in the side walls 15, 16 of the traversing unit. This rear wheel roller together with a pair of front wheel rollers 35, 36 mounted on a shaft 37 journaled in bearings 38, 39, provides rollers or wheels upon which the traversing unit may be rolled over a surface to be tested, such as surface 40 of the test piece 13. This surface 40 may be taken as the datum plane from which depths of corrosion pits are reckoned. Mounted on wheel shaft 33 to rotate in unison with it is a pinion gear 41 which meshes with a second pinion gear 42 which is mounted on a shaft 43, journaled in bearings in side walls 15, 16. Also mounted on the rotatable shaft 43 is a commutator disc 44 made of conductor metal fixed to the pinion gear 42. It has a commutator rim. That is, it has equidistant cut-out portions on its rim (see FIGS. 2 and 11) and the cut-out portions are filled with a non-conductor or insulator material 45. Hence, the disc 44 has alternate insulated areas 45 and conductor areas 46 around its entire periphery, thus providing a commutator rim. A contact arm 47 of conductor metal has a contact point 48 which yieldably contacts the commutator rim 45, 46 of the rotatable disc 44.

Figure 6:
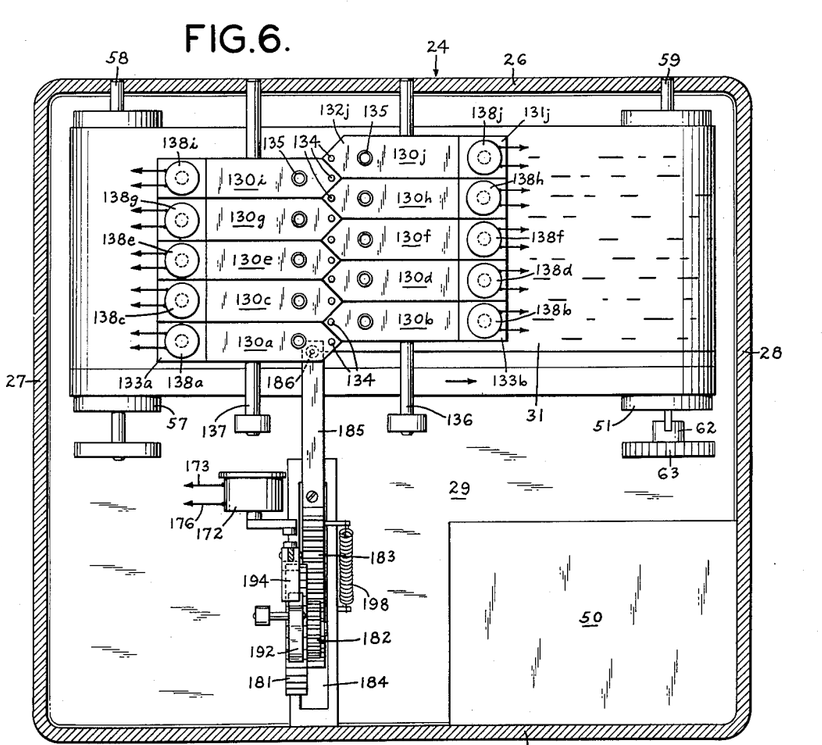
FIG. 6 is a plan view in cross section of the recording unit on line 6—6 of FIG. 1.
Figure 11:
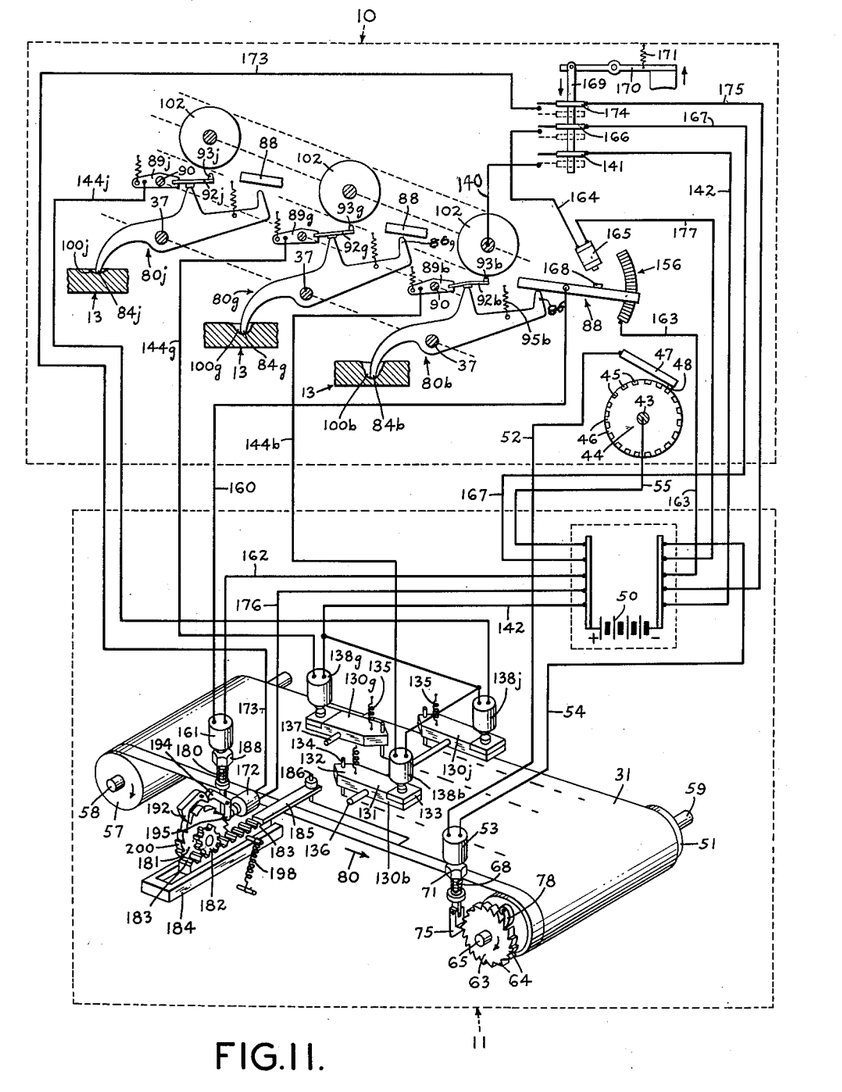
FIG. 11 is a view partly diagrammatic, partly in perspective, and partly exploded to illustrate the electrical circuit and operating mechanisms of the instrument.

Mounted within the recording unit housing is a source of current, which, as shown, is a battery 50 (see FIGS. 6 and 11). It is connected to operate the chart winding drum 51 of the recording unit. The contact arm 47 which engages the commutator rim 45, 46 is connected to a conductor wire 52 which runs through the cable 12 (see FIG. 1) to one side of a solenoid 53 mounted in the recording unit housing (see FIGS. 7, 11). The other side of solenoid 53 is connected to a conductor wire 54, in turn connected to the negative side of battery 50. The positive side of battery 50 is connected to a conductor wire 55 which runs through cable 12, from the recorder unit back to the traversing unit and this wire is connected to the body of commutator disc 44. Now it will be seen that when the traversing unit 10 is rolled on rollers 32, 35, 36 over a test surface, such as surface 40 of test piece 13, the rotation of roller 32 causes meshing gears 41, 42 to rotate, and commutator disc 44 rotates in response thereto. Hence, as the commutator rim 45, 46 rotates in contact with contact point 48, electric current is passed intermittently through contact arm 47 because of the alternate non-conductor areas 45 and conductor areas 46 of the commutator disc. Thus, current flows intermittently through the solenoid 53 from the battery 50. As explained in further detail later on this intermittent flow of current through solenoid 53 is used to cause reciprocation of a pawl, engaging a ratchet to cause the chart 31 to travel in response to movement of the traversing unit over the surface of an area being tested.

Figure 12:
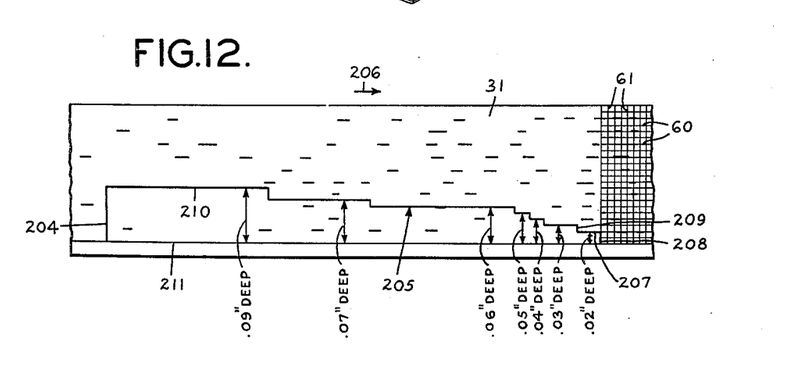
FIG. 12 is a a copy of a chart made by the instrument during a test on a given surface area.

The chart 31 is an elongate sheet of paper which is rolled on a rotatable storage drum 57 mounted on a rotatable shaft 58 mounted for rotation in the housing 24 of the recording unit. The roll of paper forming the chart 31 is trained over a rotatable receiving or winding drum 51 mounted on a shaft 59 mounted for rotation in the recording unit housing 24. The chart paper is preferably printed with equidistant longitudinal and lateral cross lines 60, 61 over its entire area, as indicated in FIG. 12. The distance between longitudinal lines is such and the mechanism may be designed and calibrated so that on the chart, as will be explained later, the longitudinal lines may be used to indicate depth of corrosion pits in a test surface and the distance between cross lines 61 may be calibrated to indicate linear distance of travel of the traversing unit over a test surface. One end of shaft 59 is mounted in a bearing in side wall 26 of the recording unit housing. The other end of the shaft 59 is fixed to the hub 62 of a ratchet wheel 63 having ratchet teeth 64; the shaft 65 of the ratchet wheel 63 being rotatable in a bearing mounted in a supporting wall 66 in the housing. Mounted for vertical reciprocation below the armature 67 of solenoid 53 is a pawl rod 68; the rod extending through suitable apertures 69 in a supporting bracket 70 in the housing. The upper end of pawl rod 68 terminates in a nut 71 of soft iron. Intermediate the bracket arms 70 (see FIG. 10) is a shoulder ring 72 fixed to the rod 68 forming a seat for a compression spring 73 which normally urges the pawl rod 68 in a downward direction. Mounted on a pivot pin 74 on the lower end of pawl rod 68 is a pawl 75 having a pointed dog 76 engaging the ratchet teeth 64. A leaf spring 77, secured to pawl rod 68, yieldingly urges the pointed dog into engagement with the ratchet teeth 64 and permits the dog to ride over the teeth on the downward stroke of the pawl rod. A pivoted holding dog 78 engages the teeth 64 and holds the drum 51 in locked position on the downward stroke of pawl rod 68.

It will now be seen that when traversing unit 10 is rolled on its rollers over a surface, the solenoid 53 becomes energized each time a contact area 46 on commutator disc 44 engages the contact point 48 of contact arm 47 and it is de-energized when the contact point engages an insulated area 45. Hence, the pawl rod is given a reciprocal motion when the traversing unit is moved along a test surface. When current passes through solenoid 53 the rod 68 is pulled in an upward stroke toward the armature 67. This causes dog 76 to pull up on a ratchet tooth to rotate the drum 51 in the direction of arrow 79. When the contact point 48 engages an insulated area 45 this cuts off the current to the solenoid 53 and the spring 73 urges the rod 68 downwardly ready to take another "bite" on the ratchet wheel 63. Hence, the winding drum is rotated to roll the chart 31 upon it and cause it to travel in the direction of arrow 80 in response to movement of the traversing unit over a surface being tested.

The feeler and probing mechanism for passing over a surface to be tested comprises a plurality of like feeler arms 80 (a to j) mounted for rotation on a fixed horizontally disposed feeler-arm shaft 37, these arms being equally spaced from each other by spacers 82. It will be understood that a greater or lesser number of feeler arms may be employed, depending on the width of the swath that it is desired to scan on the test surface in a single pass of the traversing unit. Each of feeler arms 80 (a to j) has probing finger 83 (perhaps best shown in FIG. 2) with a hardened point 84. The rear end portion 85 of each arm 80 (a to j) has a rear upwardly extending tail portion 86 and an upwardly extending intermediate tail portion 87 between the pivot 81 and the tail 86. The rear tails 86 (a to j) operate a contact plate 88 in a circuit for indicating depth of corrosion pits, as described later. And intermediate tails 87 (a to j) each operates a contact arm 89 in a circuit for indicating the magnitude or length of corrision pits having particular depths as described later.

The contact arms 89 are pivotally mounted on a horizontally disposed shaft 90, an insulator bushing 81, insulating the arm from shaft 90, and each of the contact arms 89 (a to j) are urged in a clockwise direction about this pivot by a spring 91, one end of which is secured to the arm 89 and the other to a supporting bar 92 secured to the framework. The rear end of each contact arm 89 has secured thereto a resilient leaf spring finger 92 having a contact point 93. Mounted underneath resilient member 92 is a contact pad 94 of insulated or non-conductor material. Each of the feeler arms 80 (a to j) is urged in counterclockwise direction about pivot 37 by a tension spring 95, one end of which is secured to rear portion 85 and the other to a bar 96 mounted on the framework (see FIG. 2). Now it will be seen that the probing points 84 (a to j) will ride on the surface 40 of the test piece, because they are urged in a downward direction by springs 95 (a to j). When the probing points 84 ride on the datum plane surface 40 (see finger 80b, FIG. 2), the intermediate tail 87b of finger 80b is down so that the resilient arm 92 and contact point 93 are down. When the probing point of the finger reaches a corrosion pit, such as 100, it drops into the pit because of the urging of spring 95 (see finger 83a, FIG. 2). This causes the feeler arm to rotate counterclockwise and the tail 87 moves upwardly in contact with insulated pad 94 and this moves the contact point 93 upwardly into engagement with a flat surface 101 on a vertically adjustable and rotatably adjustable contact drum 102.

Figure 4:
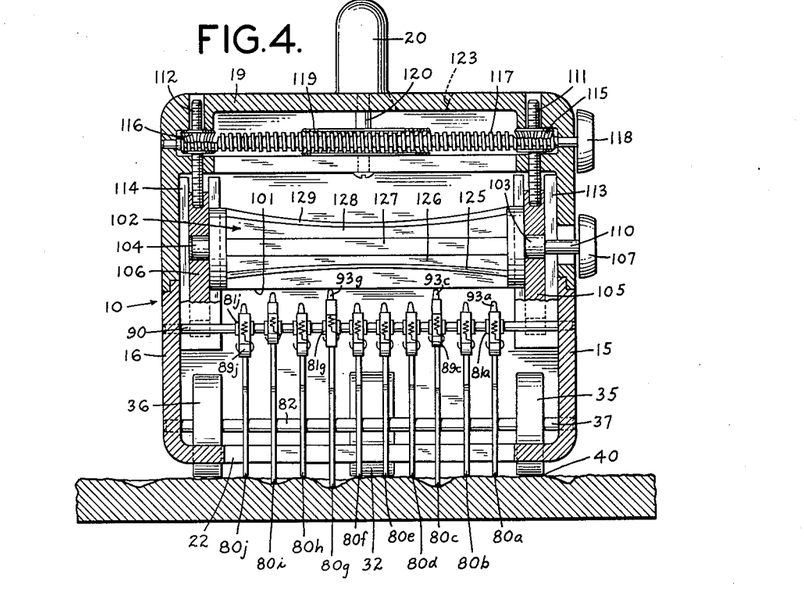
FIG. 4 is a view in elevation in cross section of the traversing unit on line 4—4 of FIG. 1, adjusted for testing a flat surface.

The contact drum 102 extends over the width of the feeler arms 80 (a to j) (see FIG. 4) and is mounted for rotation in bearings 103, 104 mounted in vertically movable blocks 105, 106. The contact drum has a plurality of contact surfaces 101, 125, 126, 127, 128, etc., each with a different radius of curvature; it being noted that contact surface 101 is flat (see FIG. 4) and the drum 102 is rotated on its axis by hand knob 107, so that the flat side 101 is down (as shown in FIG. 4) when the surface being tested is flat, as distinguished from curved. The curvature of the other contact sides 125–129 etc. on this drum are standardized curves of the same curvature as many standard pieces of equipment, such as pipes and cylinders and some of the contact surfaces on the drum are concave and some are convex.

As stated, the drum 102 may be adjustably rotated on its shaft 110 by hand knob 107. The drum 102 may be raised and lowered by means which comprise threaded elevating screws 111, 112 secured to the blocks 105, 106, which slide in vertical guideways 113, 114. Mounted on elevating screws 111, 112 are travelling internally threaded gear nuts 115, 116 which are also externally threaded to mesh with a horizontally disposed worm shaft 117 mounted in the framework for rotation by means of hand knob 118. It will now be observed that upon rotation of knob 118 the contact drum 102 may be raised and lowered by raising the bearing blocks 105, 106 in their respective framework guideways 113, 114. And by rotation of knob 107, any one of the surfaces 101, 125–129 may be positioned at the bottom of the drum.

An index disc 119 mounted for rotation on a vertical shaft 120, in turn mounted in the framework, has gear teeth 121 at its periphery which engage the worm 117. The top surface of index disc 119 carries an index scale 122 in divisions, each indicating one one-hundredth of an inch, and the worms and other gears are calibrated so that a rotation of index disc 119, through an angle of one division of scale 122 will cause a raising or lowering of the contact drum 102 by a distance of one one-hundredth of an inch. A window opening 123 in the wall of the traversing unit housing 14 will expose the index scale 122 and show the vertical position of the drum with reference to the bottoms of the wheels 32, 35, 36, which is the base or datum plane 40 of the testing surface.

Each of the feeler arms 80 (a to j) is connected to operate a contact arm 89 (a to j) which in turn is connected into an electric circuit, now to be described. And each feeler arm has a corresponding stylus in the recorder unit which is electrically operated in response to movement of its corresponding feeler arm in the traversing unit.

Mounted within the recording housing 24 and above the chart 31 (see FIG. 6) are a plurality of pivoted recorder arms 130 (a to j) herein sometimes also referred to as stylus arms, one for each of the feeler arms 80 (a to j) of the traversing unit. Each of these recorder arms is connected by an electrical circuit to its corresponding feeler arm. Each recorder or stylus arm 130 is an elongate arm having a pivot aperture, a rear portion 131 and a front portion 132. Fixed to the rear portion on an insulation piece is a soft iron plate 133 (see FIGS. 6, 11). The front ends of the stylus arms are pointed and each carries an adjustably mounted marking pen 134, held in adjusted position by a set screw. Helical tension springs 135 secured to the housing and to the stylus arms, normally urge the front end portions of stylus arms 130 (a to j) in upward direction so that the pens are out of contact with the chart 31. It will be observed that the stylus arms are mounted in two rows (see FIGS. 6, 11) on two pivot shafts 136, 137 mounted in the framework of the recorder housing.

Mounted above each of the soft iron plates 133 (a to j) on the stylus arms 130 is a solenoid, or electric magnet, 138 (a to j). Each of these solenoids for each of the stylus arms is connected by electrical circuit to be operated by its corresponding feeler arm. Upon energizing a particular solenoid 138 (a to j) this will cause the iron plate 133 to be drawn upwardly, to rotate the stylus arm about its pivot and cause its pen to engage and make a mark on the chart. It will be observed that the stylus pens lie in a straight line across the chart.

Figures 2, 8, 9:
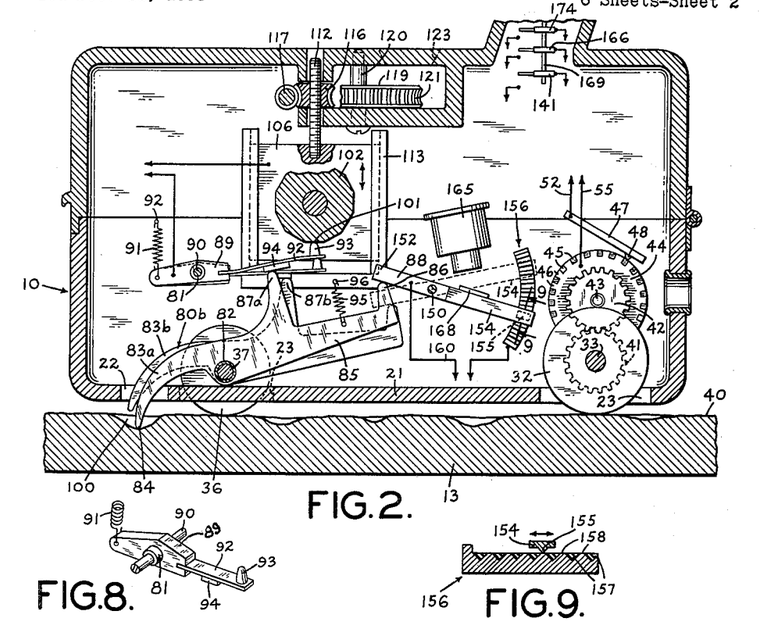
FIG. 2 is a view in elevation in cross section of the traversing unit on line 2—2 of FIG. 1.
FIG. 8 is a perspective view of a contact arm in the traversing unit.
FIG. 9 is a partial view in section of a commutator bar, forming a part of the traversing unit.
Figure 3:
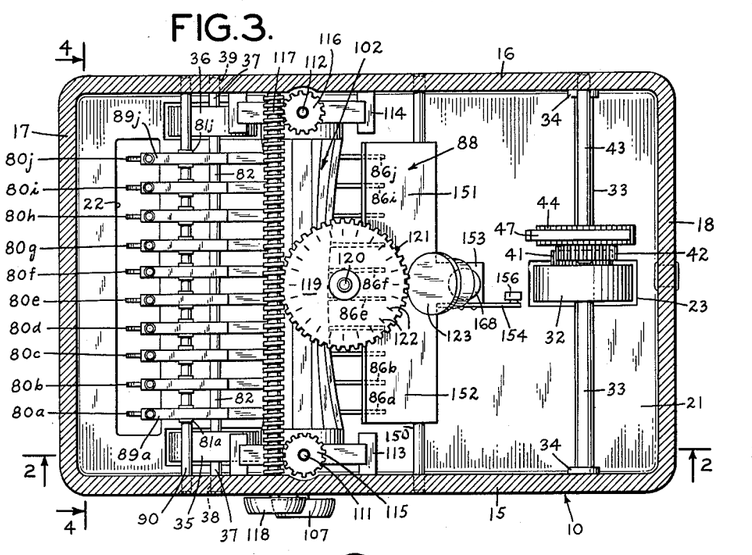
FIG. 3 is a plan view in section of the traversing unit on line 3—3 of FIG. 1.

The means for energizing the respective solenoids 138 (a to j) is perhaps best illustrated in FIGS. 8 and 11. Since each of the stylus arms is operated in the same way, a typical one will now be described. The contact drum 102 is connected by a wire 140, openable and closable switch 141, wire 142 to the negative side of battery 50, then by wire 142 to one side of solenoid 138b. The other side of solenoid 138b is connected by wire 144b to contact arm 89b.

Now it will be seen that when the traversing unit is passed over a test surface and the probing point 84b reaches a pit 100b, the feeler arm is rotated counterclockwise on shaft 81. Assuming that drum 102 has been adjusted to record corrosion pits of the depth of pit 100b, the finger tip 84b will fall into the pit as it moves over the pit and the intermediate tail 87b will be tipped upwardly and will push the resilient leaf member 92b upwardly and its contact point 93b will contact flat surface 101 on the contact drum. Assuming that switch 141 is closed, then current will flow through solenoid 138b. This will attract the soft plate of stylus arm 130b upwardly, causing the pen 134b to engage the chart and make a mark on it. As the traversing unit is moved along the test surface, the rotation of wheel roller 32 causes the chart 31 to move in the direction of arrow 80. After the probing point 84b passes beyond the pit 100b, the point will follow the surface of the test piece and the feeler arm is moved by spring 95b clockwise to break the contact between contact point 93b and contact surface 101 on the drum. This de-energizes the solenoid 138b and the pen is raised from the chart 31.

Each of the feeler arms is connected by electrical circuit as described above in connection with feeler arm 80b. An illustrative wiring diagram showing three typical stylus arms is shown in FIG. 11, and it will be understood that all of them may be connected in the same way; it being understood that the wires from the traversing unit to the recording unit may be carried in cable 12. Wire 142 is connected to each of the solenoids 138. A wire 144g connects solenoid 138g with contact arm 89g which, in turn, operates in response to movement of feeler arm 80g; the contact point making contact with drum 102. A wire 144j connects solenoid 138j with contact arm 89j which in turn operates in response to movement of feeler arm 80j; the contact point 93j making contact with drum 102. Now it will be seen that each of the probing fingers is connected in the circuit so that it will operate its solenoid and hence its corresponding marking pen when the fingers are moved into corrosion pits and the width of the test swath will correspond to the width covered by the fingers 80 on shaft 81. The manner of presetting the apparatus in order to measure and record only pits of a predetermined depth and magnitude in order to obtain data regarding pit pattern and density is explained later on.

The apparatus is also provided with means, now to be described, for measuring and recording maximum depth of corrosion pits in the surface being tested. Pivotally mounted on a horizontally disposed shaft 150 in the framework is a contact plate 88. The contact plate has a rectangular-shaped portion 151, the front end 152 of which is positioned above the upwardly extending rear tails 86 (a to j) of the feeler arms 80 (a to j). The other end of this contact plate 88 terminates in a tail piece 153 from which extends a resilient contact tail 154 having a contact point 155 which engages and rides over a fixed commutator sector 156 when the contact plate is rotated on its pivot 150. The commutator sector is of conductor material and has cut-out portions on its surface. Alternate cut-out portions are filled with insulation material. Hence, the commutator surface comprises alternate insulated areas 157 and conductor areas 158. Hence, when the contact point slides over the commutator sector it will conduct current only intermittently, depending on whether the contact point is in engagement with a conductor or an insulated area.

Figure 7:
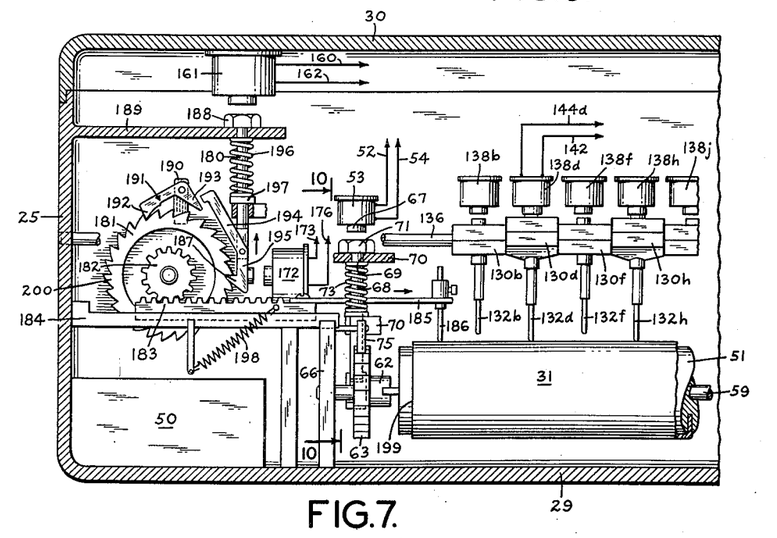
FIG. 7 is a partial end view in section of the recording unit on line 7—7 of FIG. 1.

The contact plate 88 is connected by a wire 160 to one side of a solenoid 161 mounted in the recording unit (see FIGS. 2, 7, 11). The other side of the solenoid 161 is connected by a wire 162 to the positive side of battery 50. A wire 163 connects the negative side of the battery with the commutator sector 156. A wire 164 is connected to one side of a solenoid 165 fixedly mounted in the traversing unit housing; this wire 164 being connected to openable and closeable switch 166, which switch is also connected to the positive side of battery 50 by wire 167. The negative side of the battery is connected by wire 177 to the other side of solenoid 165. When switch 166 is closed the solenoid 165 is energized and the soft iron plate 168 fixed to the tail piece of contact plate 88 is attracted to the core of the solenoid so that the contact point and tail 154 is moved to its uppermost position as shown in dotted lines in FIG. 2. The upward movement of any one of tail pieces 87 (a to j) will operate the contact plate 88. The switch 166 is such that it may be closed on downward movement of common switch rod 169 to make contact and then open on further downward movement of switch rod 169. The switch rod 169 may be operated by a pivoted finger lever 170, which normally urges the rod 169 upwardly because of spring 171.

Another solenoid 172 is fixedly mounted in the recorder housing for a purpose described later. One side of this solenoid 172 is connected by a wire 173 to an openable and closeable switch 174, operated by switch rod 169. This switch 174 is connected by wire 175 to the negative side of battery 50. A wire 176 connects the positive side of battery 50 with the other side of solenoid 172. It will now be seen that solenoid 161 is energized through commutator sector 156 and solenoid 172 is energized through switch 174. These two solenoids operate mechanism for registering the maximum depth of pit which any of the probing fingers 83 encounter in the path of travel of the traversing unit over a test surface. This mechanism comprises a vertically reciprocatable pawl rod 180, a rotatable ratchet wheel 181 operated by the pawl, a pinion gear 182 rotatable with the ratchet, a reciprocatable rack 183 slidable in a guideway 184 and carrying a pen arm 185 upon which is mounted a marking pen 186 which travels in engagement with the chart 31 as the chart travels, to record maximum depth of corrosion pits traversed.

Pivotally mounted on the lower end of vertically reciprocatable pawl rod 180 is a pawl 195 having a pointed dog 187. A soft iron nut 188 is mounted on its upper end; this nut being drawn upwardly with the pawl rod 180 upon energization of solenoid 161, this nut also serving as a stop which rests on framework member 189 to arrest downward movement of the pawl rod. Mounted on a post 190 is an angularly-shaped pawl 191 having a locking dog 192 and an escapement arm 193 (see FIG. 7). Also mounted on pawl 195 is an unlocking arm 194. A compression spring 196 resting on a seat ring 197 normally urges the pawl rod 180 in a downward direction. A tension spring 198, one end of which is secured to the rack 183 and the other to a stake on the framework, normally urges the rack in a direction away from the chart 31. It will return the arm 185 and hence pen 186 to the edge 199 of the chart 31.

The operation of the maximum depth recording mechanism is as follows: when the switch 174 is closed by operation of finger lever 170, current will pass through solenoid 172 causing the core to draw the dog 195 out of locking engagement with ratchet teeth 200 of ratchet wheel 181. This also causes this dog to swing arm 194 into contact with escapement arm 193 of locking pawl 192 and disengages dog 192 from the ratchet teeth 200. This permits free rotation of ratchet wheel 181. The result is that the rack 183 is drawn by spring 198 to its normal or starting position so that pen 186 is at the edge 199 of the chart 31. When the switch 174 is open, as for example, when the switch rod 169 is moved downwardly its full stroke as shown in dotted lines in FIG. 11, the flow of current to solenoid 172 is interrupted and the dogs 195 and 192 again move into engagement with ratchet teeth 200. It can now be assumed that this is the starting position for a test. If the probing fingers do not encounter a pit, the contact plate 88 will maintain its normal or zero position as shown in dotted lines in FIG. 2, because none of the tails 87 (a to j) of the feeler fingers 80 (a to j) have moved the contact tail 154 downwardly on commutator sector 156. If any of the probing fingers encounter a pit, it will move downwardly into it and cause the plate 88 to be rotated an amount corresponding to the depth of the pit, assuming the drum 102 has been set accordingly. This will cause contact arm 154 to rotate and the contact point 155 will move on to a conductor area 158 on commutator sector 156. This will cause current to pass through solenoid 161 to energize it. This results in the pawl rod 180 being raised, since the soft iron nut is attracted to the solenoid-electromagnet 161. This causes the ratchet wheel 181 to be rotated an amount equal to the amount the dog 187 moves the teeth 200. The pinion 182 rotates with ratchet wheel 181 and moves rack 183 and hence marking pen 186 inwardly on the chart by that amount. The pen will remain there until the solenoid is again de-energized and re-energized and this will come about when a feeler finger encounters a deeper pit than had theretofore been passed over by the traversing unit. Each time the solenoid 161 is energized and then de-energized, the spring 196 will move the pawl 195 downwardly ready for another "bite" on the ratchet wheel. It will now be apparent that the deeper the pit encountered by a probing finger, the greater will be the angle traversed by the contact point 155 of contact arm 88, and the number of pulsations of energizations and de-energizations of solenoid 161 will correspond with the depth encountered by the probing fingers of the feeler arms. Hence, on a given presetting of the height of drum 102 in the traversing unit, the marking pen 186 will indicate the maximum depth of corrosion pits in the area scanned by the traversing unit. At the end of any pass, or in fact at any time, the marking pen 186 (the maximum depth pen) may be returned to zero position at the edge 199 of chart 31 by closing switch 174.

Referring now to the chart illustrated in FIG. 12, the continuous stepped line 205 is the line which is made by pen 186; the drum 102 having been set to record depths of pits up to .09". The chart moves in the direction of arrow 206. Portion 207 shows that from the beginning of the test at 208 one of the probing fingers 80 encountered a pit of .02" depth, it being noted that the paper is ruled so that each horizontal space between horizonal lines 60 represents .01". At 209, as the scanning unit 10 continued in its path of travel over the test area, one of the fingers 80 encountered a pit .03" deep. This would mean that the contact point 155 of tail piece 154 of contact plate 88 had moved downwardly on commutator sector 156 a distance to cause a corresponding amount of reciprocation of pawl rod 180, in turn causing rack 183 to move pen 186 inwardly an amount corresponding to .02". As the scanning unit continued in its path over the test piece it encountered a pit .04" deep, .06" deep, and .07" deep, until finally it encountered a pit .09" deep as represented by portion 210 of line 205 (see FIG. 12). The vertical line 204 shows that the test was ended and switch 174 was closed. This causes current to pass through solenoid 172, to release the pawls 192 and 194 which permits spring 198 to return the maximum depth pen to 0° position, indicated by reference line 211 at the edge of the chart paper.

Figure 13:
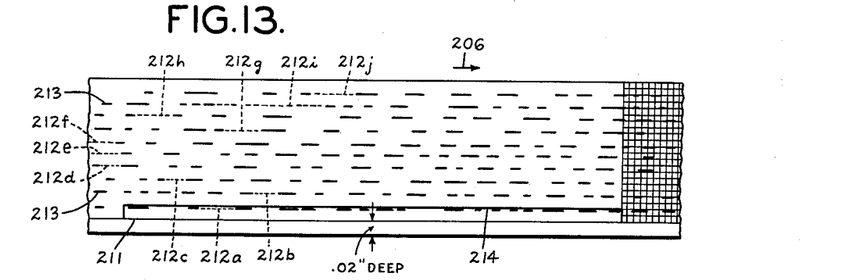
FIG. 13 is a similar chart for the same surface area but with a different setting of the instrument.

The chart in FIG. 13 illustrates the record of a test run in which the traversing unit 10 was set to record pits in the test area traversed on a flat surface which are at least .02" in depth. In this instance the drum 102 is rotated so that the flat contact surface 101 is at the bottom, or six o'clock position. The knob 118 is used to adjust the height of the drum above the datum plane 40 of the test piece 13. By rotation of knob 118, worm 117 is rotated, which, in turn, will raise or lower the drum, as desired, so that when any of fingers 84 of feeler arms 80 drop into a pit at least .02" in depth, the tail piece 87 will be raised high enough to contact the contact surface 101 of the drum. As mentioned hereinbefore, this will cause current to pass through the drum and through the electrical circuit for the particular contacting finger to actuate its solenoid 138 in the recorder unit and its marking pen 132 will make a corresponding mark on the travelling paper chart 31. In FIG. 13, the horizontal broken lines 212 ($a$ to $j$) represent the pits encountered by the probing fingers 84 ($a$ to $j$) respectively, in the path of travel of the traversing unit over the test area. Each of the pen marks in each of said lines represents a pit in the area traversed which is at least .02" in depth and the length of each mark is some indication of length of the pit it represents. It is to be understood, however, that the height of the drum, having been set by knob 118 to record pits at .02" depth as shown by index scale 122, each of the marks in lines 212 ($a$ to $j$) in the chart shown in FIG. 13, only represents a pit in the flat surface being tested of at least .02" in depth; because it is possible that some of the pits traversed may be deeper. It may be also noted that the line 214 (FIG. 13) represents the mark made by maximum depth pen 186 which will register only a depth of .02" because of the drum setting.

Figure 14:
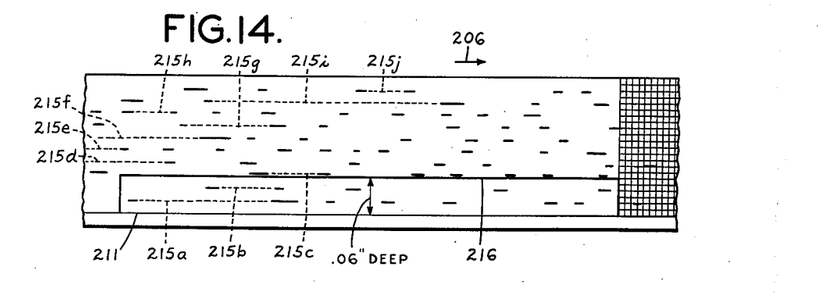
FIG. 14 is a similar chart for the same area but with still another setting of the instrument.

A test chart over the same area, as represented in FIG. 13, but with the drum 102 set to record corrosion pits of at least .06" in depth, is shown in FIG. 14. In this test the knob 118 was rotated so that index scale 122 was set so that the probing fingers would register pits of at least .06" in depth. That is, the surface 101 of drum 102 was set so that electrical contact was made with the drum by the feeler arm, only when a probing finger dipped into a pit having a depth of at least .06". The marks on broken lines 215 ($a$ to $j$) represent each pit in the test area within the path of travel of the scanning unit 10 which was at least .06" in depth; it being understood that some of the pits traversed may have been deeper. This was the fact as shown by the chart shown in FIG. 15, which covers the same test area, but with the traversing unit set to record pits of at least .09" in depth. Continuous line 216 shows the mark made in this test by the maximum depth pen 186.

Figure 15:
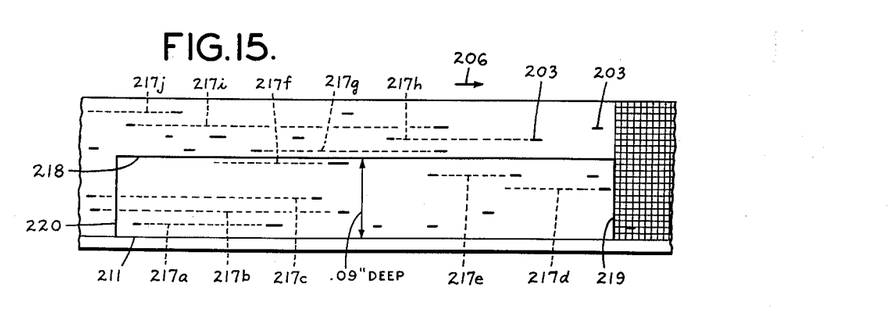
FIG. 15 is a chart for the same area but with still another setting of the instrument.

The chart shown in FIG. 15 is similar to those shown in FIGS. 13 and 14 but shows the condition of the same test area with regard to pits of at least .09" in depth; it being understood that drum 102 was adjusted as to height by knob 118 so that pits of at least .09" depth only would be recorded on the chart. The marks 203 on broken lines 217 ($a$ to $j$) indicate corrosion pits in the test area of at least .09" depth. The maximum depth line 218 indicates the mark made by pen 186 during the travel of the scanning unit over the test area. Vertical lines 219 indicate the beginning of the test pass and vertical line 220 indicates the end of that test pass.

It will be understood from the foregoing that the apparatus may be used to record various factors which are useful for pit corrosion analysis, including maximum pit depth, pit pattern, pit density, pit dimension and pit severity at any depth. This may be accomplished by the various settings of the instrument and then by a comparative study of different charts which cover the same test area; or by making a record of present surface conditions to be compared with records of the surface condition of the same area at a later time, to determine the extent of corrosion over a period of time.

Figures 5, 10:
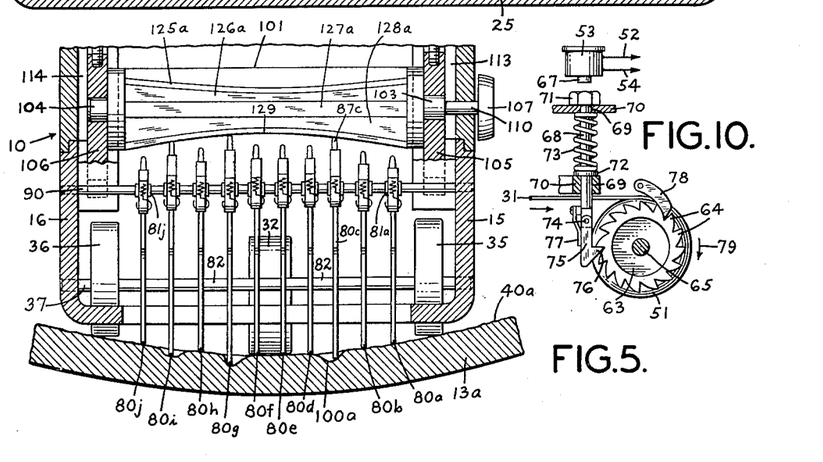
FIG. 5 is a view in elevation in cross section similar to FIG. 4 but showing the instrument adjusted for testing a curved surface.
FIG. 10 is a view in elevation of a pawl and ratchet wheel for rotating the chart winding drum on line 10—10 of FIG. 7.

As heretofore mentioned, the apparatus is useful not only for flat surfaces but also may be adjusted for use on curved surfaces. Such an adjustment is illustrated in FIG. 5 of the drawings. In this adjustment the drum 102 has been rotated by knob 107 so that the curved contact surface 129 (of the various curved surfaces of the drum) is at the bottom or six o'clock poistion. This particular surface 129 of drum 102 was selected because it corresponds to the surface 40$a$ of test piece 13$a$. It will be seen that the ends of probing fingers 84 ($a$ to $j$) will normally lie in the curved datum plane 40$a$ of the curved test piece 13$a$. When the scanning unit 10 is moved over the test surface and any one of the probing fingers encounters a pit, for example, if finger 84$c$ of feeler arm 80$c$ encounters a pit 100$a$, the tail 87$c$ is tipped up and makes contact with surface 129 of drum 102, as in the case of a flat surface. However, the curved surface contact area 129, being the same as the curved surface 40$a$ of the test piece, compensates for the curved surface of the test piece 13$a$, and the scanning unit operates as for scanning a flat surface, except for such slight error as may be introduced because the pivot shaft 37 on which the feeler arms are rotatably mounted is straight. In many instances of testing, such error is sufficiently small that for practical purposes, it may be disregarded. It will also be observed that the drum 102 has a wide variety of curved surfaces, some of which may be concave and some convex. These are made to have radii which correspond to the radii of standard sizes and shapes of pipes, cylinders and other equipment, to give the instrument a wide range of practical use. And it will be understood that in testing the surface irregularities of a curved surface, the contact area of drum 102 which corresponds with the test surface will be moved to the six o'clock position for the test.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A device for measuring and graphically recording surface conditions of an object, such as pit corrosion on the surface of a metal object, which comprises a scanning unit manually movable in a predetermined path of travel over a surface to be tested and a recording unit connected to said scanning unit for graphically recording the surface conditions of the surface in said path of travel; said scanning unit comprising a framework, a feeler arm shaft mounted on said framework, an array of pivoted feeler arms pivotally mounted side by side for rotation on said feeler arm shaft, said feeler arms each having a probing point engageable with the surface being tested and movable into pits encountered when said scanning unit is moved in said path of travel, said arms rotating on their pivots in response to movement of said probing points into and out of said pits, the normal position of said probing points being in a datum plane at said surface being tested, said feeler arms each having a tail member, each of said tail members having a rear tail portion and an intermediate tail portion, thus providing an array of intermediate tail portions and an array of rear tail portions, an electrical contact member mounted on said framework, means mounting said electrical contact member operative to move said electrical contact member toward and away from said array of intermediate tail portions, a second shaft mounted on said framework above said feeler arm shaft, an array of pivoted resilient electrical contact arms pivotally mounted side by side on said second shaft, one each for each of said array of feeler arms and each contact arm having a conductor portion positioned to be engaged by the intermediate tail portion of its corresponding feeler arm and movable into engagement with said electrical contact member in response to rotation of its corresponding feeler arm when the probing point of that feeler arm moves into a pit in said surface, said recorder unit comprising, a travelling chart, a plurality of pivotally mounted recording arms, one for each of said feeler arms, a recording stylus on each of said recording arms, means mounting said chart operative to move said chart past said styluses, means, including an electrical circuit through said contact member and said resilient contact arms, connecting each of said feeler arms with its corresponding recorder arm and operative in response to movement of its corresponding feeler arm to rotate its corresponding recorder arm about its pivot to cause its stylus to engage said chart when its corresponding probing point encounters a pit in said path of travel.

2. A device according to claim 1 in which said electrical contact member which is movable toward and away from said array of intermediate tail portions is in the form of a rotatable drum mounted for rotation on its axis and said drum comprises a plurality of conductor faces each of which may be positioned by rotation of said drum on its axis to be engaged by said resilient contact arms, said plurality of faces including convex and concave faces of different radii and at least one flat face.

3. A device according to claim 1 in which said scanning unit includes a pivoted contact plate mounted for rotation, one portion of which is engageable by each of the rear tail portions of said array of feeler arms, and a commutator segment engaged by the other portion of said contact plate and in which said recorder unit includes a recorder arm mounted for reciprocation, said reciprocatable recorder arm having a stylus engaging said travelling chart, solenoid means operated by electric current and means operative in response to operation of said solenoid means to reciprocate said reciprocatable recorder arm and a separate electric circuit connected through said pivoted contact plate, said commutator segment, and said solenoid means.

4. A device according to claim 1 in which said scanning unit includes means mounting said electrical contact member operative to adjust the position of said electrical contact member toward and away from said array of intermediate tail portions.

5. A device according to claim 1 in which said scanning unit includes a roller wheel upon which to roll said scanning unit on said surface and a first drive means connected to said roller wheel and in which said recording unit includes a rotatable winding drum mounting said chart, a drum driving means connected to said drum operative in response to rotation of said roller wheel to rotate said winding drum for moving said chart past said stylus and an electric circuit connecting said first drive means and said drum driving means.

6. A device according to claim 5 in which said electrical contact member which is adjustable toward and away from said array of intermediate tail portions is in the form of a drum having a shaft mounted for rotation in vertically adjustable journal blocks and said drum has a plurality of contact faces including convex and concave faces of different radii and at least one flat face.

7. A device according to claim 3 in which said scanning unit includes a solenoid to rotate said pivoted contact plate to zero position on said commutator segment and in which said recorder unit includes a solenoid for each of said recorder arms.

References Cited in the file of this patent

UNITED STATES PATENTS

| | | |
|---|---|---|
| 1,894,025 | Dennison | Jan. 10, 1933 |
| 1,928,457 | Mershon | Sept. 26, 1933 |
| 2,177,051 | Birmingham | Oct. 24, 1939 |
| 2,305,264 | Leonard | Dec. 15, 1942 |
| 2,330,801 | Abbott | Oct. 5, 1943 |
| 2,342,687 | Parrish | Feb. 29, 1944 |
| 2,398,562 | Russell | Apr. 16, 1946 |
| 2,576,590 | Gentzhorn | Nov. 27, 1951 |
| 2,608,092 | Williamson | Aug. 26, 1952 |
| 2,620,655 | Priest | Dec. 9, 1952 |
| 2,672,049 | Hallendorff | Mar. 16, 1954 |

FOREIGN PATENTS

| | | |
|---|---|---|
| 870,765 | Germany | Mar. 16, 1953 |
| 696,643 | England | Sept. 2, 1953 |